(12) United States Patent
Sommerlade et al.

(10) Patent No.: US 10,499,045 B2
(45) Date of Patent: Dec. 3, 2019

(54) COLLABORATIVE SIGHTING

(71) Applicant: 2D3 Limited, Oxford, Oxfordshire (GB)

(72) Inventors: Eric Sommerlade, Oxford (GB); Emmet Spier, Oxford (GB); Julian Morris, Oxford (GB)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/444,554

(22) Filed: Feb. 28, 2017

(65) Prior Publication Data

US 2017/0171542 A1  Jun. 15, 2017

Related U.S. Application Data

(63) Continuation of application No. 15/345,037, filed on Nov. 7, 2016, now abandoned, which is a
(Continued)

(30) Foreign Application Priority Data

Apr. 30, 2012  (GB) .................................. 1207480.3

(51) Int. Cl.
*H04N 17/00* (2006.01)
*G06K 9/52* (2006.01)
(Continued)

(52) U.S. Cl.
CPC .......... *H04N 17/002* (2013.01); *F41G 1/345* (2013.01); *F41G 1/38* (2013.01); *F41G 3/02* (2013.01);
(Continued)

(58) Field of Classification Search
CPC .... H04N 17/002; H04N 5/23293; G06T 7/73; G06T 7/80; G06T 2207/30244;
(Continued)

(56) References Cited

U.S. PATENT DOCUMENTS 6,711,293 B1  3/2004  Lowe
2006/0121993 A1*  6/2006  Scales ..................... A63F 13/10
463/48
(Continued)

FOREIGN PATENT DOCUMENTS

EP  2192546  6/2010
EP  2375376  10/2011
EP  2645205 A2  10/2013

OTHER PUBLICATIONS

UK Examination Report for Application No. GB1207480.3, dated Oct. 2, 2017, 6 pgs.
(Continued)

*Primary Examiner* — Michael E Teitelbaum
(74) *Attorney, Agent, or Firm* — Moore Intellectual Property Law, PLLC

(57) ABSTRACT

A method includes generating calibration data by geometrically calibrating first image data from a first camera unit relative to second image data from a second camera unit based on first descriptor data and second descriptor data. The first descriptor data is based on the first image data. The second descriptor data is based on the second image data. The method includes identifying, based on the calibration data, a target location relative to the first image data. The method further includes generating an output image that includes the first image data and an indication of where the target location is relative to a scene depicted in the first image data.

20 Claims, 9 Drawing Sheets

Related U.S. Application Data continuation of application No. 14/397,576, filed as application No. PCT/GB2013/051102 on Apr. 30, 2013, now Pat. No. 9,509,987.

(51) Int. Cl.
| | |
|---|---|
| *H04N 5/232* | (2006.01) |
| *F41G 3/02* | (2006.01) |
| *G06T 7/80* | (2017.01) |
| *G06T 7/30* | (2017.01) |
| *G06T 7/70* | (2017.01) |
| *G06T 7/73* | (2017.01) |
| *G06K 9/00* | (2006.01) |
| *F41G 1/34* | (2006.01) |
| *F41G 1/38* | (2006.01) |
| *G01C 11/12* | (2006.01) |
| *G06F 3/0488* | (2013.01) |

(52) U.S. Cl.
CPC .......... *G01C 11/12* (2013.01); *G06F 3/0488* (2013.01); *G06K 9/00664* (2013.01); *G06K 9/52* (2013.01); *G06T 7/30* (2017.01); *G06T 7/70* (2017.01); *G06T 7/73* (2017.01); *G06T 7/80* (2017.01); *H04N 5/23293* (2013.01); *G06T 2207/10004* (2013.01); *G06T 2207/10012* (2013.01); *G06T 2207/20016* (2013.01); *G06T 2207/30212* (2013.01); *G06T 2207/30244* (2013.01)

(58) Field of Classification Search
CPC ... F41G 1/345; F41G 1/38; F41G 3/02; G01C 11/12; G06F 3/0488
See application file for complete search history.

(56) References Cited

U.S. PATENT DOCUMENTS

| | | | |
|---|---|---|---|
| 2008/0004603 | A1 | 1/2008 | Larkin et al. |
| 2008/0007627 | A1* | 1/2008 | Huang ............... H04N 5/23212 348/211.9 |
| 2010/0287485 | A1 | 11/2010 | Bertolami et al. |
| 2011/0043620 | A1 | 2/2011 | Svanholm et al. |
| 2012/0274627 | A1* | 11/2012 | Huggett ............. H04N 13/0246 345/419 |
| 2013/0162469 | A1* | 6/2013 | Zogg ................... G01C 15/002 342/357.25 |

OTHER PUBLICATIONS

Badri, et al., "Camera-to-Camera Mapping for Hybrid Pan-Tilt-Zoom Sensors Calibration", 15th Scandinavian Conference, SCIA 2007; Jun. 10, 2007, pp. 132-141.

Yeo, et al., "Coding of Image Feature Descriptors for Distributed Rate-efficient Visual Correspondences", International Journal of Computer Vision; vol. 94, No. 3; Mar. 3, 2011, pp. 267-281.

Del Bimbo, A., et al., "Exploiting Distinctive Visual Landmark Maps in Pan-Tilt-Zoom Camera Networks," Computer Vision and Image Understanding, Elsevier, 114, Jan. 2010, pp. 611-623.

Examination Report under Section 18(3) received from the Intellectual Property Office United Kingdom, for Application No. GB1207480.3, dated Apr. 24, 2018, 4 pgs.

Examination Report under Section 18(3) for Application No. GB1207480.3 dated Aug. 17, 2018, 5 pgs.

* cited by examiner

COLLABORATIVE SIGHTING

CROSS-REFERENCE TO RELATED APPLICATIONS

This application claims priority from and is a continuation of U.S. patent application Ser. No. 15/345,037, entitled "COLLABORATIVE SIGHTING," filed Nov. 7, 2016, which claims priority from and is a continuation of U.S. patent application Ser. No. 14/397,576, entitled "COLLABORATIVE SIGHTING," filed Oct. 28, 2014 and now issued as U.S. Pat. No. 9,509,987, which is a national stage entry of and claims priority from International Application No. PCT/GB2013/051102 filed Apr. 30, 2013, which claims priority from Great Britain Application No. 1207480.3, filed Apr. 30, 2012, the contents of each of which are expressly incorporated herein by reference in their entirety.

FIELD

The present invention relates to collaborative sighting using optical sighting apparatuses that comprise a camera unit and a display device.

The present invention has a range of applications in which plural optical sighting apparatuses are used to image a scene, but has particular advantage for use to sight military targets, for example as a weapons sight.

BACKGROUND

In such applications it is often desired for users of different optical sighting apparatuses to sight a common location. This is particularly true for urban environments where the risk of targeting inaccuracies causing unintended collateral damage is most acute. Furthermore, in an urban environment there is greatly increased risk of confused line-of-sight identification of a target's location, for example the wrong doorway, window, building, or street.

'Triangulation' is an ancient technique used in warfare and peace. Two or more observers take bearings on a target. From knowledge of their relative positions, the location of the target is easily determined. Both active and passive methods are used to determine the bearing. With active methods it is also generally possible to determine range based on time-of-flight (TOF), providing additional targeting measurements. For all methods of geometrical targeting, it is clearly essential to ensure that both observers are looking at the same target. If the target is obvious or the source of a unique identifier such as the sound or flash of a gunshot, this uncertainty may not apply. However, when using visual bearings in urban environments, there is often confusion over whether both/all observers are looking at the same target. Targeting often depends upon an exchange of verbal descriptions, which is highly susceptible to mistakes.

Current target designation systems often employ an active system wherein a laser is projected onto the target. The laser point may be detected by a monochromatic detector. However, active designation is not covert as the enemy may detect the laser indicating the fact that an object is being targeted, and worse still allowing the targeting laser to be located. Furthermore, the laser is relatively expensive to implement and increases the size of the equipment.

It is desirable that the equipment is portable. For example in a military application, this is a dominant constraining factor. Driven largely by consumer electronics, devices for determining position, heading, and range (including a global positioning satellite (GPS) receiver, microelectromechanical systems (MEMS) inertial measurement units (UMIs), magnetometers, and laser time-of-flight (TOF) rangefinders) have become small enough to be truly portable by an individual. Even with their power supplies, they represent minimal weight or size penalty to the user. While these devices are ideal for general outdoor navigation, when used alone, they are generally not sufficiently accurate for use in targeting. For example even with a limited standoff of 100 m, a 3 degree error which is typical for a MEMS device translates to a targeting error of 5 m, which is unacceptable in many military applications.

SUMMARY

Accordingly the present invention is based on an appreciation that optical sighting apparatuses may be used to collaborative sight an object in a scene being imaged. As an optical instrument, a camera unit has the same basic ability to measure relative angles as a theodolite and is a truly portable device According to an aspect of the present invention, there is provided a method of collaborative sighting using plural optical sighting apparatuses that each comprise: a camera unit arranged to capture an image of a portion of a scene within the field of view of the camera unit; and a display device arranged to display the image captured by the camera unit, the method comprising:

detecting features within images captured by the camera units of the optical sighting apparatuses;
  generating descriptors in respect of each image from respective patches of the image at the position of each detected feature;
  detecting corresponding descriptors generated from different images;
  deriving the geometric calibration of the camera units with respect to the scene from the positions in the respective images of the features corresponding to the detected corresponding descriptors;
  in respect of at least one target location in the image captured by the camera unit of a first one of the optical sighting apparatuses, identifying, from the derived geometric calibration of the camera units, a corresponding location relative to the image captured by the camera unit of a second one of the optical sighting apparatuses that corresponds to a target location in the scene that itself corresponds to the target location in the image captured by the camera unit of the first one of the optical sighting apparatuses; and
  indicating on the display device of the second optical sighting apparatus where the corresponding location lies relative to the displayed image.

Accordingly the present invention is based on an appreciation that optical sighting apparatuses may be used to collaboratively sight an object in a scene being imaged. As an optical instrument, a camera unit has the same basic ability to measure relative angles as a theodolite and is a truly portable device. The present invention employs a technique that allows a geometric calibration of the camera units to be derived from the images. A target location is designated in an image captured in a first optical sighting apparatus, for example being at a predetermined position within that image, such as a central location of the image that may be identified to the user of the first optical sighting apparatus by displaying cross-hairs on the image, or the boundary of the field of view of the first optical sighting apparatus. The geometric calibration allows identification of a corresponding location in an image captured in a second optical sighting apparatus. That corresponding location may then be indicated on the display device of the second optical sighting apparatus.

In the case that the corresponding location is inside the field of view of the second optical sighting apparatus, then the corresponding location may be indicated by being superimposed on the image. However, it is a particular advantage that the collaborative sighting may still be performed even in the case that the corresponding location is outside the field of view of the second optical sighting apparatus, provided that there is sufficient overlap between the portions of the scene imaged by the optical sighting apparatuses to allow the geometrical calibration to be performed. In this case, the corresponding location may be indicated by displaying a pointer towards the corresponding location, and optionally a distance measure. That allows the user of the second optical sighting apparatus to change the field of view of the camera unit, for example by changing the pan, tilt or zoom (PZT) of the camera unit, so as to image the corresponding location.

In order to derive the geometric calibration, the present invention utilizes a particular technique in which features are detected within images, descriptors are generated in respect of each image from respective patches of the image at the position of each detected feature and corresponding descriptors generated from different images are detected. The geometric calibration of the camera units with respect to the scene is derived from the positions in the respective images of the features corresponding to the detected corresponding descriptors. It has been appreciated that such a technique may be used to obtain the geometric calibration in real time to a sufficient accuracy to allow the collaborative sighting to be performed.

Performance of the steps of the method may be distributed between the optical sighting apparatuses and optionally also a central processing apparatus, which may be arranged to communicate over a communications network. In general any steps may be performed in any apparatus.

One of the optical sighting apparatuses may act as an analysis apparatus that performs the steps of detecting corresponding descriptors and deriving the geometric calibration of the camera units with respect to the scene.

In that case, it is advantageous if the second optical sighting apparatus acts as the analysis apparatus, because this minimizes the requirements for data communication as the indication of the corresponding location is performed on the display device of the same optical sighting apparatus. However, the processing requirements in the optical sighting apparatus may be reduced if a central processing apparatus acts as the analysis apparatus.

Advantageously, the steps of detecting features and generating descriptors are performed in respect of each image by the optical sighting apparatus whose camera unit captures that image, and the optical sighting apparatuses that are not the analysis apparatus communicate the descriptors and the positions in the respective images of the features corresponding to the descriptors to the analysis apparatus over the communication network. This reduces the requirements for data communication because the descriptors may be designed to have a smaller data amount than the images from which they are derived.

According to a further aspect of the present invention, there is provided a system for performing collaborative sighting that comprises plural optical sighting apparatuses and optionally also a central processing apparatus, and that implements a similar method. According to yet further aspects of the present invention, there are provided the individual apparatuses of such a system.

To allow better understanding, an embodiment of the present invention will now be described by way of non-limitative example with reference to the accompanying drawings, in which:

DETAILED DESCRIPTION

Figure 1:
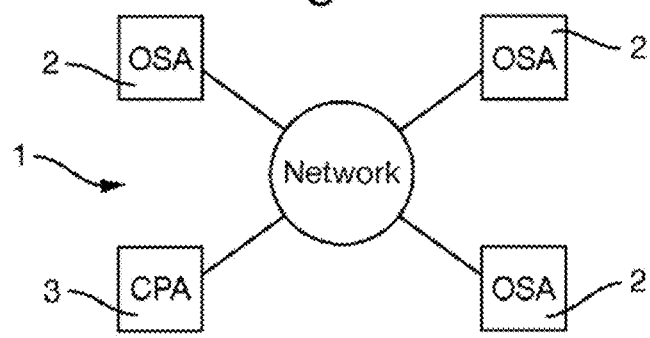
FIG. 1 is a diagram of a system for performing collaborative sighting.

FIG. 1 illustrates a system 1 for performing collaborative sighting. The system 1 comprises plural optical sighting apparatuses 2. Three optical sighting apparatuses 2 are shown in FIG. 1 by way of example but in general any number may be provided.

The system 1 also may comprise, as an optional element, a central processing apparatus 3. The optical sighting apparatuses 2 and the central processing apparatus 3, where provided are each connected to a communications network 4 over which they can communicate with each other. The communications network 4 may be of any type and operate in accordance with any suitable communications protocol. The communications network 4 is most typically a wireless network operating at radio frequencies, but may alternatively be a wireless network operating at other frequencies or a wired or optical network. The communications network 4 may use any communication protocol, for example TCP/IP. The communications network 4 may encrypt communicated data in order to preserve security.

Figure 2:
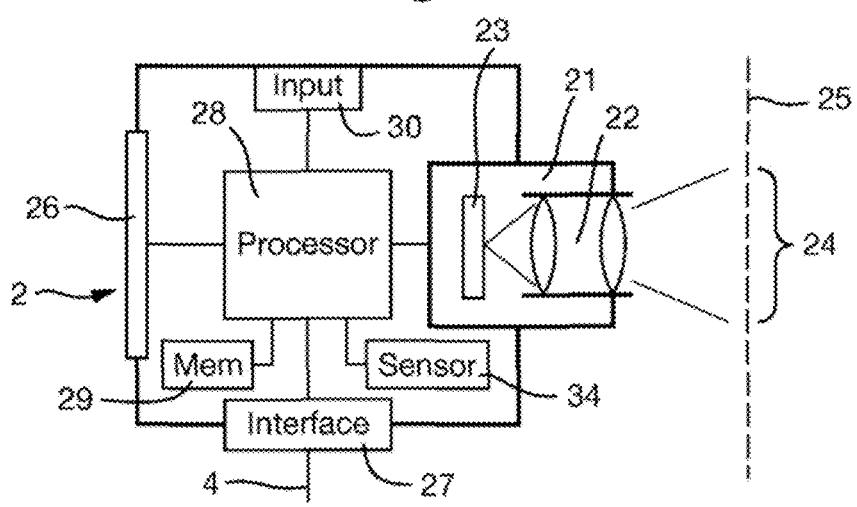
FIG. 2 is a diagram of an optical sighting apparatus of the system.

Each optical sighting apparatus 2 is arranged as shown in FIG. 2 and includes the following components.

A camera unit 21 comprises a lens system 22 and an image sensor 23 arranged in the focal plane of the lens system 22. The lens system 22 focuses an image of a portion 24 of a scene 25 within the field of view of the camera unit 21 (as illustrated schematically in FIG. 2). The lens system 22 may be formed by any suitable optics, typically including several lenses. The lens system 22 may have a field of view that is adjustable, either manually by the user or automatically by the optical sighting apparatus 2 (in particular by the processing unit 28 described below).

The sensor element 23 may have any construction, for example being a CMOS (complementary metal-oxide semiconductor) device, and may operate in any suitable part of the electromagnetic spectrum, including visible light and infrared.

The optical sighting apparatus 2 includes a display device 26 that is capable of displaying images. The display device 26 may be of any suitable type, for example an LCD display.

The optical sighting apparatus 2 includes a communication interface 27 for connection to the communications network 4. The communications interface 27 contains suitable elements for providing hardware and/or software elements for providing data communications over the communications network 4 in accordance with the communications protocol used.

The optical sighting apparatus 2 further comprises a processing unit 28 that is connected to the other components, including the camera unit 21, the display device 26 and the communications network 27. The processing unit 28 is configured to control the various elements of the optical sighting apparatus 2, including the following functions. The processing unit 28 supplies images captured by the image sensor 23 of the camera unit 21 receives images captured by the image sensor 23 of the camera unit 21, and may store these in a memory 29 of the optical sighting apparatus 2. The processing unit 28 may process such images.

The processing unit 28 may also supply the images to the display device 26 for display thereon. The processing unit 28 may overlay graphical elements on the image supplied to the display device 26, for example graphical elements indicating locations on the image, such as cross hairs at the center, or symbols indicating the operational status of the optical sighting apparatus 2, such as the optical settings of the lens system 22 or the information on the status of the communications interface 27.

The processing unit 28 may be implemented by a processor executing an appropriate control program, although alternatively functions of the processing unit 28, for example image processing functions, may be implemented using appropriate hardware components, for example an FPGA (field programmable gate array) or ASIC (application specific integrated circuit).

The optical sighting apparatus 2 also comprises an input device 30 for receiving user inputs. The input device 30 is connected to the processing unit 28 to allow the operation controlled by the processing unit 28 to be controlled by the user on the basis of the user inputs. The input device 30 may take any suitable form, for example being a panel of keys, or being integrated with the display device 26 in the form of a touch-sensitive screen.

Figure 3:
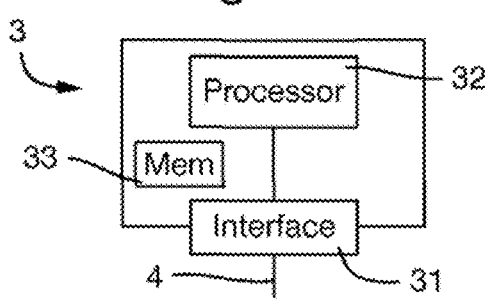
FIG. 3 is a diagram of a central processing apparatus of the system.

FIG. 3 illustrates the central processing apparatus 3 which comprises the following elements.

A communications interface 31 is provided for connection to the communications network 4. The communications interface 31 contains suitable elements for providing hardware and/or software elements for providing data communications over the communications network 4 in accordance with the communications protocol used.

A processing unit 32 is connected to the communications interface 31. The processing unit 32 is configured to communicate with the optical sighting apparatuses 2 using the communications interface 31. The processing unit 32 receives images captured by the optical sighting apparatuses 2 and may store these in a memory 33 and analyze them. The processing unit 32 may be implemented by a processor executing an appropriate control program, although alternatively various functions of the processing unit 32, for example image processing functions, may be implemented using appropriate hardware components, for example an FPGA (field programmable gate array) or ASIC (application specific integrated circuit).

The central processing apparatus 3 may be implemented in a conventional computer apparatus such as a personal computer.

The system 1 having the arrangement described above may be used in a range of applications where it is desired for different users to collaboratively sight objects in a common scene.

In typical applications, the optical sighting apparatuses 2 are each configured to be portable by the user, for example manually or on a vehicle. Similarly, in accordance with the application the optical sighting apparatuses 2 may be hand-held or mounted on a support.

In contrast, the central processing unit 3, where provided, reduces the processing burden on the optical sighting apparatuses 2, albeit at the expense of increasing the need for reliable data communications over the communications network 4. Accordingly, the central processing apparatus 3 does not need to be portable by the users of the optical sighting apparatuses 2 and may be provided at a central location, provided only that it is capable of data communications in real time over the same communications network 4 as the optical sighting apparatuses 2. For example, the central processing apparatus 3 may be implemented by conventional computer apparatus, for example a personal computer.

Some examples of applications are as follows.

Figure 4:
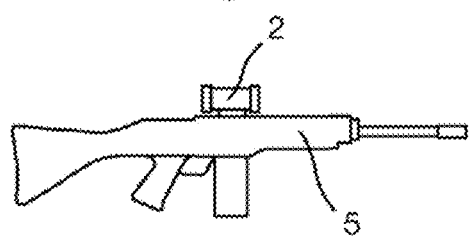
FIG. 4 is a view of an optical sighting applied as a weapon sight.

The optical sighting apparatuses 2 may have a military application in which they are used to sight objects for targeting. The optical sighting apparatus 2 may be a weapons sight that is adapted to be connected to a weapon. For example, FIG. 4 illustrates an optical sighting apparatus 2 that is a gun sight mounted on a gun 5, but could equally be a sight for any other type of weapon. Alternatively, the optical sighting apparatus 2 may be a device that is used by military personnel independently of a weapon, for example in the form of a telescope or binoculars or mounted on a vehicle, to locate and engage with an enemy target.

However, the system 1 may equally be applied to a range of non-military applications.

In one non-military application, the optical sighting apparatuses 2 may be hand-held devices, similar to a telescope or binoculars, used by a group of wildlife enthusiasts operating collectively to locate, observe, and record images of birds, animals, and other flora and fauna.

In another non-military application, the optical sighting apparatuses 2 may be used to observe a scene from a set of moving vehicles on land, sea, air, or space. The observations may be undertaken for any purpose for which it is necessary to determine and control the overlap of images, including but not limited to targeting, scientific measurement, image mosaic generation.

The system 1 is arranged to perform collaborative sighting using a method that will now be described. In general, the method is performed by the processing units 28 of the optical sighting apparatuses 2 and optionally also the processing unit 32 of the central processing apparatus 3, where provided, with the steps distributed between the apparatuses 2 and 3 that communicate necessary data over the communications network.

The method involves at least two of the optical sighting apparatuses 2 capturing images of respective portions 24 of the same scene 25. A target location is designated in the image captured by the camera unit 21 of a first one of the optical sighting apparatuses 2 which will be referred to hereinafter as the designator 2D. The collaborative sighting method has the purpose of identifying the corresponding location relative to the image produced by the camera unit 21 of second one of the optical sighting apparatuses 2, referred to hereinafter as the seeker 2S. That corresponding location corresponds to a target location in the scene that itself corresponds to the target location in the image produced by the camera unit 21 of the designator 2D.

In general, the optical sighting apparatuses 2, including their arrangement and the processing performed thereby can be entirely identical and symmetrical for all optical sighting apparatuses 2. This allows any of the optical sighting apparatuses 2 to operate as the designator 2D and the seeker 2S. Alternatively, the system 1 can be arranged with optical sighting apparatuses 2 that performed the operation asymmetrically.

There will now be described an example of the method for collaborative sighting performed in a case that the central processing apparatus 3 is absent or at least not used. This method is shown in the flow chart of FIG. 5. In this example, the seeker 2S acts as an analysis apparatus that derives the geometric calibration on the basis of images captured by the designator 2D and seeker 2S.

Figure 5:
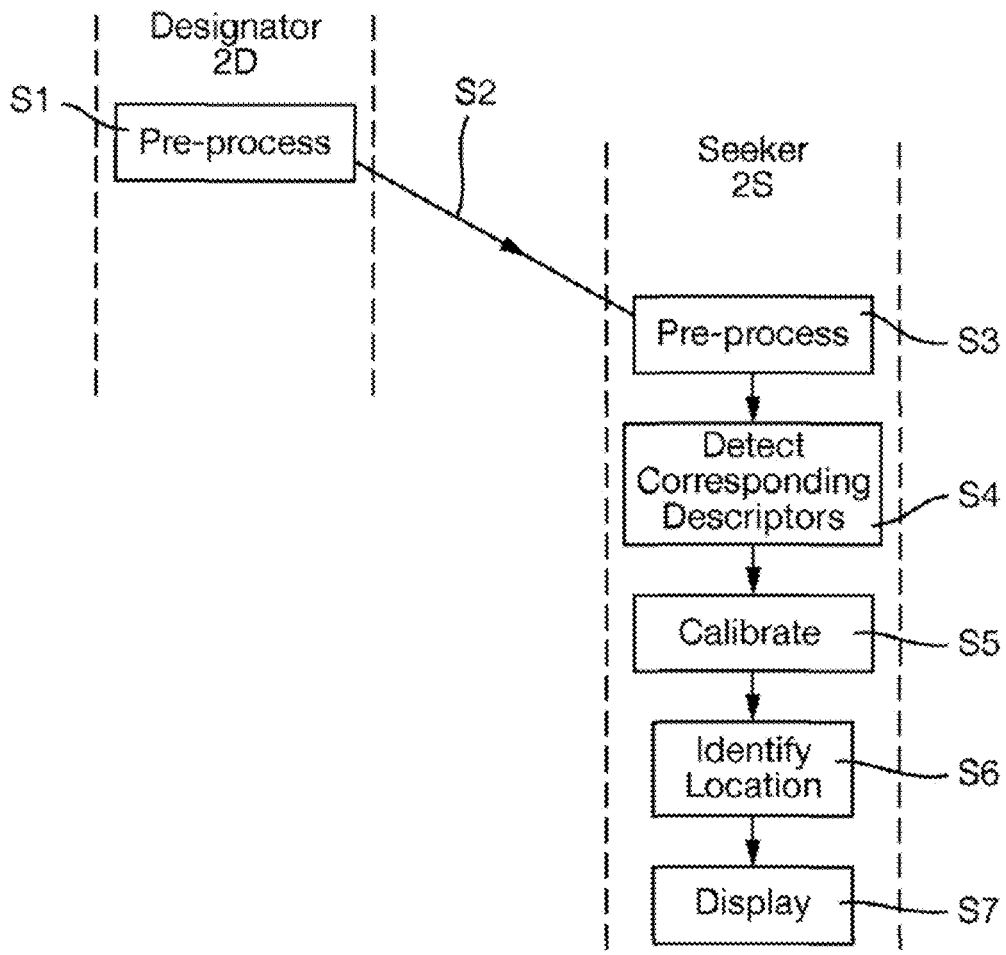
FIG. 5 is a flow chart of a method of collaborative sighting.
Figure 6:
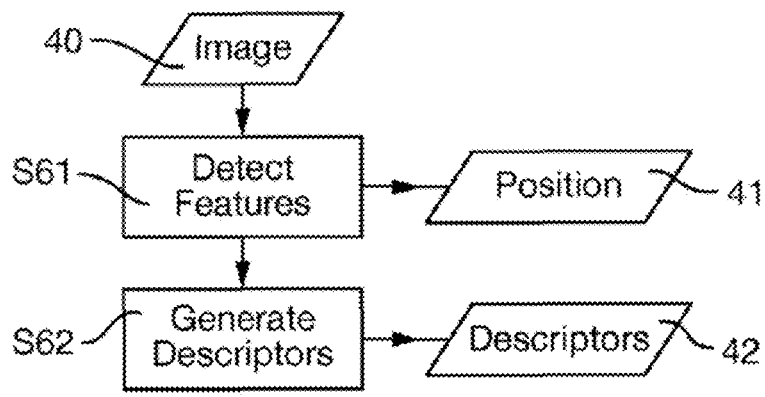
FIG. 6 is a flow chart of a pre-processing method used within the method of collaborative sighting.

In this method, each of the designator 2D and the seeker 2S pre-process images captured therein to generate descriptors from the image locally using an identical pre-processing method, that is in steps S1 and S3 of FIG. 5. This pre-processing method is shown in FIG. 6 and comprises two steps S61 and S62 as follows.

In general terms, the collaborative sighting is facilitated by extraction and comparison of areas of the image. In principle, these could range in size from the whole image, to a region containing an actual object that is observed, down to single pixels. Given expected changes in viewpoint and lighting conditions in the context of use of the optical sightings apparatuses 2 in a range of environments, typically outdoors, a sparse approach is chosen.

In step S61, the image 40 captured by the camera unit 21 of the optical sighting apparatus 2 (which may be the designator 2D or the seeker 2S) is analyzed to detect features within that image. The position of each feature within the image 40 is output as position data 41. In general, any type of image feature may be detected, using any of a range of existing feature detectors known for image processing. Such features are conventionally also referred to as interest points or key points. As to the choice of feature to be detected a priority here is speed, since the whole image 40 must be scanned. Given the typical currently available processing speeds, the general aim is to produce several hundred features distributed as evenly as possible over the image. If the image 40 has a relatively high-resolution, then the image may be down-sampled beforehand to reduce the processing burden.

The exact nature of the features is tuned towards quantity in typical images, ease of acquisition, and reliable localization.

The feature detectors are advantageously chosen to be invariant to one or more of scale, view angle (including rotation about the device's optical axis), intensity, color and other potential variations due to the viewer and target locations, attitude, and the observer's equipment.

Scale-invariance and rotation-invariance may be achieved by detecting the features as maxima and/or minima in the differences of different scale spaces of the image 40. As the different scale spaces of the image 40 represent the content of the image 40 at different scales, such features are effectively maxima of curvature in the image 40, in any direction, and at different resolutions including the original resolution coarser resolutions. One possible approach for this is as follows.

The image 40 represented by $I(x,y)$ is convolved with Gaussian filters represented by $G(x,y,k\sigma)$ at different scales $k\sigma$ to derive the scale spaces of the image 40 represented by $L(x,y,k\sigma)$ in accordance with the equation:

$$L(x,y,\sigma)=G(x,y,\sigma)*I(x,y)$$

The differences $D(x,y,\sigma)$ at different scales $\sigma$ between the scale spaces $L(x,y,k\sigma)$ of the image, hereinafter referred to as the differences-of-blurs image $D(x,y,\sigma)$, are taken in accordance with the equation:

$$D(x,y,\sigma)=G(x,y,k_i\sigma)-G(x,y,k_j\sigma)$$

Hence the differences-of-blurs image $D(x,y,\sigma)$ between scales $k_i\sigma$ and $k_j\sigma$ is just the difference of the scale spaces of the image at scales $k_i\sigma$ and $k_j\sigma$.

Figure 7:
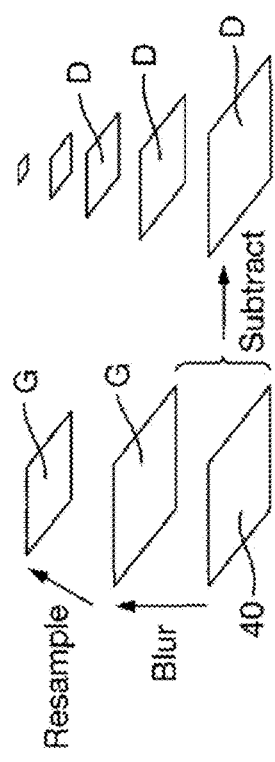
FIG. 7 is a schematic diagram of deriving differences-of-blurs images at different scales.

This method is illustrated schematically in FIG. 7.

Figure 8:
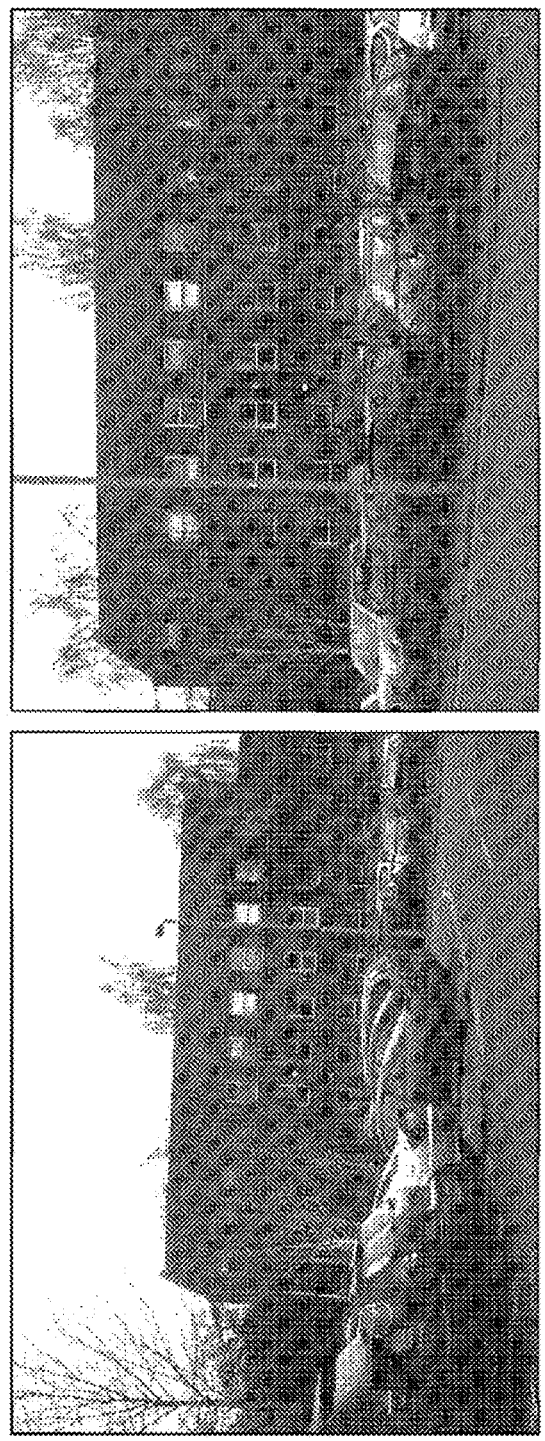
FIG. 8 shows two images taken by different optical sighting apparatuses of overlapping portions of a common scene.
Figure 9:
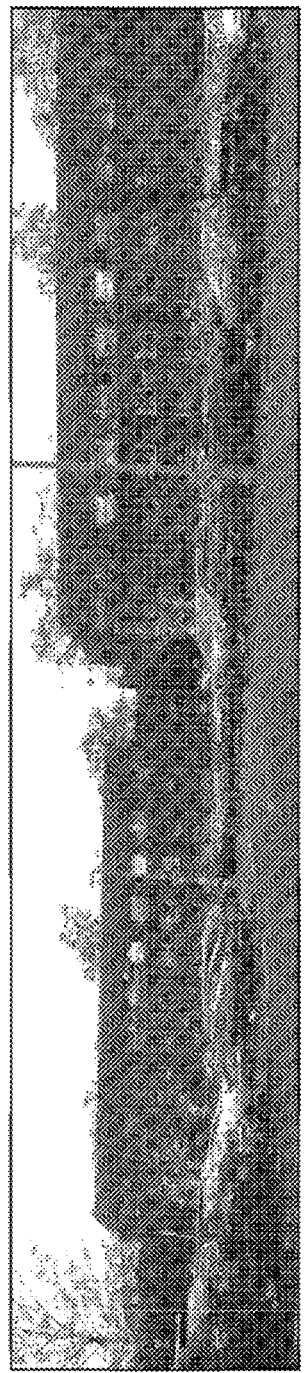
FIG. 9 shows the two images of FIG. 8 with detected features identified.

An example of the detection of features using this method is shown in FIGS. 8 and 9. In particular, FIG. 8 shows two images taken by different optical sighting apparatuses 2 of overlapping portions of a scene including a building, and FIG. 9 shows the same images with location of detected features identified by circles.

Maxima and/or minima in the differences-of-blurs image $D(x,y,\sigma)$ at different scales $\sigma$ are detected as the features. This may be done by comparing each pixel in the differences-of-blurs image $D(x,y,\sigma)$ to its eight neighbors at the same scale and nine corresponding neighboring pixels in each of the neighboring scales. If the pixel value is the maximum or minimum among all compared pixels, it is selected.

Further details that may be applied in the present method are disclosed in Lowe, "Object recognition from local scale-invariant features", Proceedings of the International Conference on Computer Vision. 2. pp. 1150-1157, 1999 and in U.S. Pat. No. 6,711,293 (both incorporated herein by reference).

Such a feature detection step is a variation of one of the blob detection methods disclosed in Lindeberg, "Feature detection with automatic scale selection", International Journal of Computer Vision 30 (2): 79-116, 1998 (incorporated herein by reference), that involve detecting scale-space extrema of the scale normalized Laplacian, that is detecting points that are local extrema with respect to both space and scale, in the discrete case by comparisons with the nearest 26 neighbors in a discretized scale-space volume. The difference of Gaussians operator can be seen as an approximation to the Laplacian, here expressed in a pyramid setting. Such blob detection methods as disclosed in Lindeberg may be applied for feature detection in the present invention.

An alternative approach for detecting features is to use the so-called Maximally Stable Extremal Regions (MSER) technique. The idea behind MSER is to find relatively large regions that exhibit homogeneity in color or texture. This kind of imagery is often found in man-made environments, if one thinks of letters or labels. MSER are described by a neighborhood of pixels which have a constant intensity change along its boundaries, and can be implemented very efficiently. The output of this feature detector in MSER is the center of such regions.

In step S62, there are generated a set of descriptors associated with the respective features. In particular, each descriptor is generated from a respective patch of the image at the position of the associated feature. Descriptor data 42 representing the set of descriptors is output.

The purpose of the descriptors is to provide information about the region of the image at each of the detected features that allows identification of these features in other images. Whereas the features are selected for localization, the descriptor is aimed at distinctiveness.

As to the patch of pixels around each detected feature used for generating the descriptors, the size is selected as a balance between the discriminatory information contain that increases with size and perspective distortions between views that increase with size and degrade the comparison of the descriptors. Due to noise and actual similarity of the input images, the descriptors can be arbitrarily close, despite stemming from an originally different point.

The descriptors may be generated in a range of different ways. At simplest, the descriptor could simple be the image data of the patch, but that reduces the ability to detect matching descriptors in different images. Indeed, the problem with making direct comparisons (cross-correlation) of patches around features is that they appear different with changes of intensity, color balance, scale, and rotation. Accordingly, the descriptors are preferably a transform of the patch.

Advantageously, the descriptors are chosen to be invariant to one or more of scale, view angle (including rotation about the device's optical axis), intensity, color and other potential variations due to the viewer and target locations, attitude, and the observer's equipment. A number of methods are known for generating such descriptors, some examples of which are described further below.

One possibility is that the descriptor is generated using the so-called Scale-Invariant Feature Transform (SIFT) which provides scale-invariance and rotation-invariance. SIFT descriptors are derived as follows from features obtained by detecting the features as maxima and/or minima in the differences of different scale spaces of the image 40, as follows with reference to the example shown in FIGS. 10a to 10c. This step is performed on the scale space of the image 40 represented by $L(x,y,k\sigma)$ closest in scale to the scale of the detected feature, so that the descriptors are derived from respective patches of the image in the scale space of the image in which the maxima and/or minima in the differences of samples is detected. This step derives descriptors that comprise histograms of image gradients in different directions across the respective positions of the detected features.

Figure 10A:
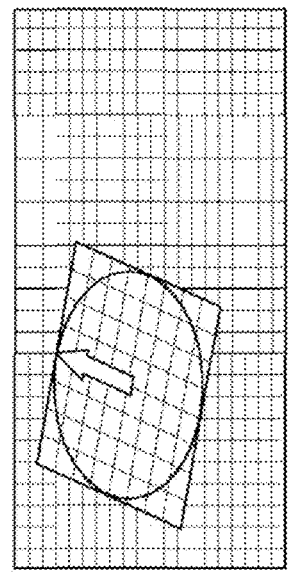
FIGS. 10a to 10c illustrate the derivation of a SIFT descriptor.
Figure 10B:
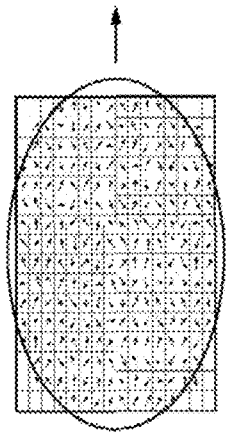

As shown in FIG. 10a which illustrates a patch 50 of the scale space of the image 40 used in respect of a feature at position 51, there is first derived the dominant gradient 52 in the image patch 50. As shown in FIG. 10b, the patch is orientated to this dominant gradient in the image patch around the feature. This achieves invariance to the rotation in the image without compromising information by relying on rotational invariant measures, which in turn facilitates the identifiability of a descriptor.

Figure 10C:
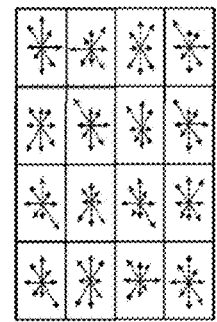

Next, as shown in FIG. 10c for an example in which the patch 50 is a 16×16 pixel region of the scale space of the image 40, a set of orientation histograms are created on 4×4 pixel neighborhoods with 8 bins each. These histograms are computed from magnitude and orientation values of samples in a 16×16 region around the keypoint such that each histogram contains samples from a 4×4 subregion of the original neighborhood region. The magnitudes are further weighted by a Gaussian function with equal to one half the width of the descriptor window. The descriptor then becomes a vector of all the values of these histograms. Since there are 4×4=16 histograms each with 8 bins the vector has 128 elements. This vector is then normalized to unit length in order to enhance invariance to affine changes in illumination. To reduce the effects of non-linear illumination a threshold of 0.2 is applied and the vector is again normalized.

Further details of SIFT that may be applied in the present method are disclosed in Lowe, "Object recognition from local scale-invariant features", Proceedings of the International Conference on Computer Vision. 2. pp. 1150-1157, 1999 and in U.S. Pat. No. 6,711,293 (both incorporated herein by reference).

As an alternative, the descriptor may be generated using the so-called Speeded Up Robust Features (SURF) technique. SURF approximates the gradient extraction by using integral images, which results in different weighting of the surrounding pixels. SURF has the a similar approach as SIFT, but tries to approximate the underlying computations with integral images as much as possible. In typical images, the SURF features seem to be very dense (several thousands of SURF features instead of hundreds in the case of SIFT) so the features may be reduced by taking only the top 500 with the highest maxima or minima in scale space.

As another alternative, the descriptor may be generated using the MSER technique.

Reverting to FIG. 5, in the method of collaborative sighting as the optical sighting apparatuses 2 are symmetric, one of the optical sighting apparatuses 2 acts as the designator 2D after the user of the designator 2S has sighted a target in the scene within the image displayed on the display device 26 of his optical sighting apparatus 2. The optical sighting apparatus 2 may become the designator 2D as a result of user action, for example by detecting that the image remains constant so indicating that the target is being held in view, or by user input, for example by user input through the input device 30, for example by the pressing of a key or other control. At other times, the roles of the designator 2D and seeker 2S may be interchanged between the optical sighting apparatuses 2.

In response to an optical sighting apparatus 2 so becoming the designator 2D, the designator 2D in step S1 performs the pre-processing method shown in FIG. 6 and described above on the image 40 captured by its camera unit 21.

Next in step S2, the designator 2D communicates the position data 41 representing position of each feature within the image 40 and the descriptor data 42 representing the set of descriptors derived in step S1 is communicated to the seeker 2S over the communications network 4.

On receipt of this data, the seeker 2S in step S3 performs the pre-processing method shown in FIG. 6 and described above on the image 40 captured by its camera unit 21.

In an alternative implementation, the designator 2D may instead communicate the image 40 captured therein to the seeker 2S over the communications network 4. The communicated image 40 may be compressed, preferably with lossless compression, although lossy compression may alternatively be used and the collaborative sighting can still be performed successfully provided that the degree of compression is not too great. In this case step S1 is performed in the seeker 2S rather than the designator 2D.

The seeker S2 now acts as an analysis apparatus by performing, in steps S4 and S5, an analysis of the set of descriptors represented by the descriptor data 42 and the position of each feature within the image 40 represented by the position data 41, derived from both the image captured in the designator 2D (i.e. in step S1) and the image captured in the seeker 2S (i.e. in step S3). Step S4 is shown in detail in FIG. 11, and performed as follows.

In step S4, corresponding descriptors generated from the different images are detected. Step S4 operates on the sets of descriptors (commonly known as "vectors" since the descriptors have multiple dimensions) from each image, typically several hundred from each. Step S4 outputs correspondence data 43 that indicates the descriptors from the different images that correspond to each other.

Figure 11:
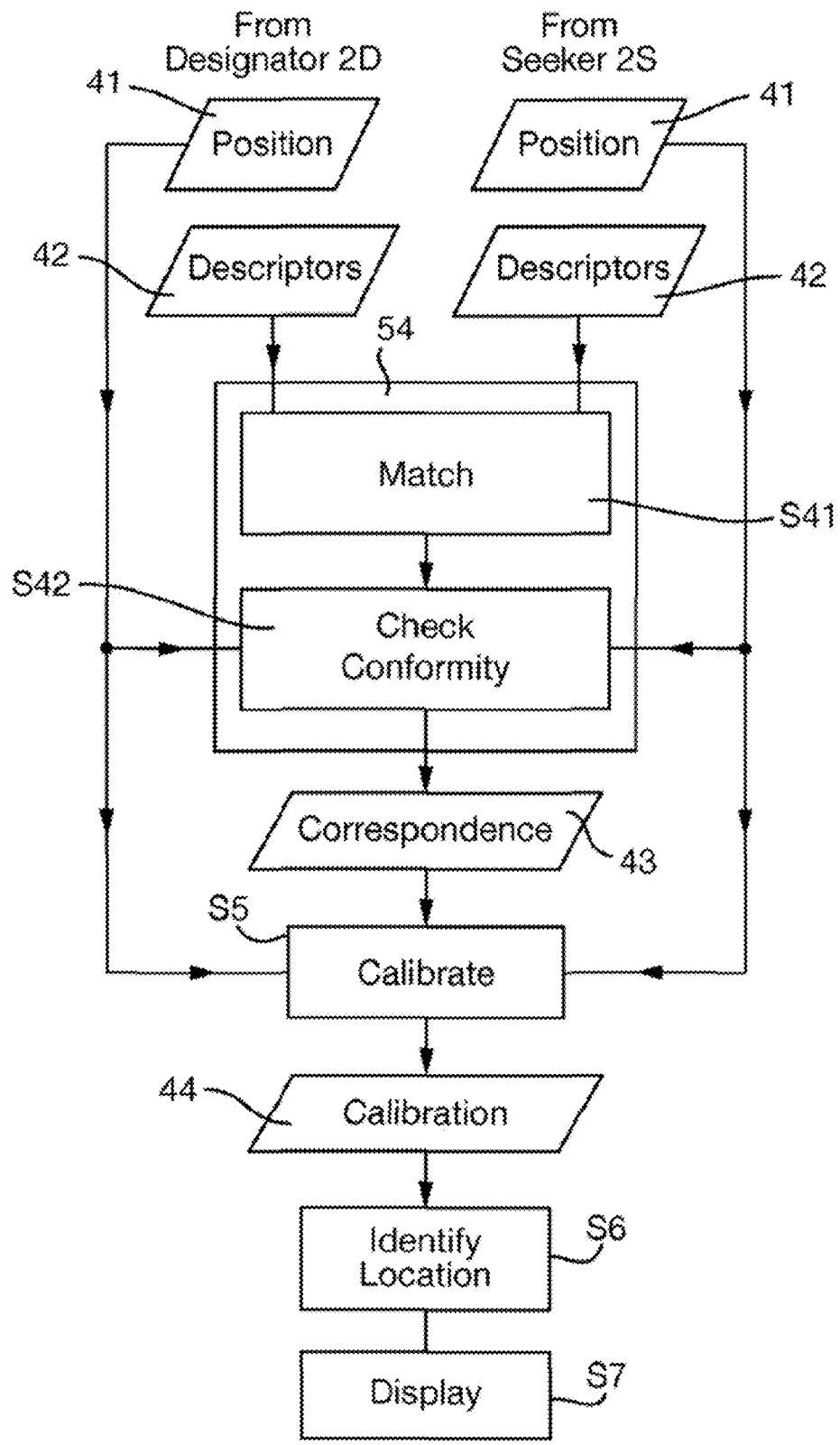
FIG. 11 is a detailed flowchart of steps S4 to S6 of the flow chart of FIG. 5.

Step S4 itself comprises two steps S41 and S42 as shown in FIG. 11.

In step S41, descriptors generated from the different images that match are detected. Matching may be determined using any measure of proximity, for example a distance function, and classifying a match where the measure of proximity indicates similarity above a threshold, that may be fixed or may be adaptively determined to obtain a reasonable number of matches. For efficiency, an approximate-nearest-neighbor data structure may be used. One option is to use the approach disclosed in Muja and Lowe, "Fast approximate nearest neighbors with automatic algorithm configuration", International Conference on Computer Vision Theory and Application VISSAPP'09, pages 331-340. INSTICC Press, 2009 (incorporated herein by reference). Using the principles of hash-tables, proximity can be quickly established but might yield false positives.

Figure 12:
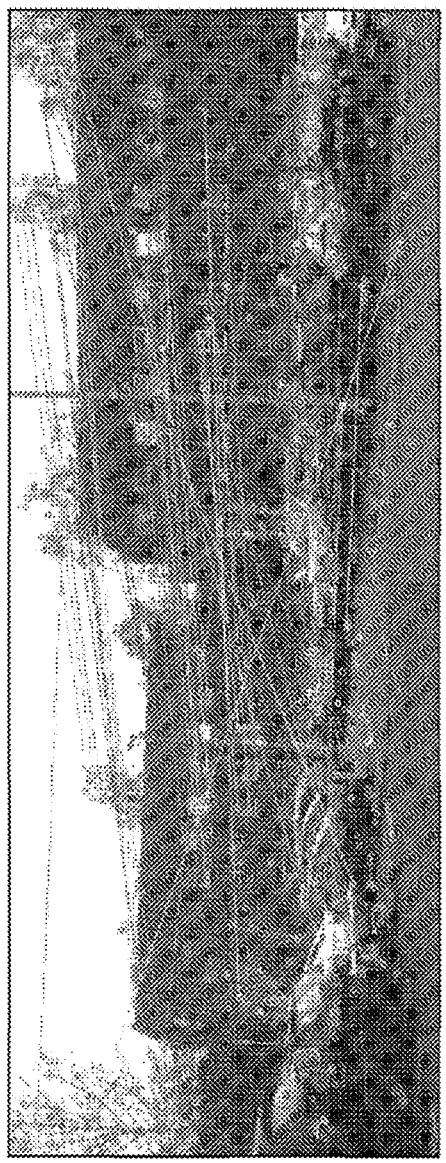
FIG. 12 shows the images of FIG. 8 with matching features identified by lines.
Figure 13:
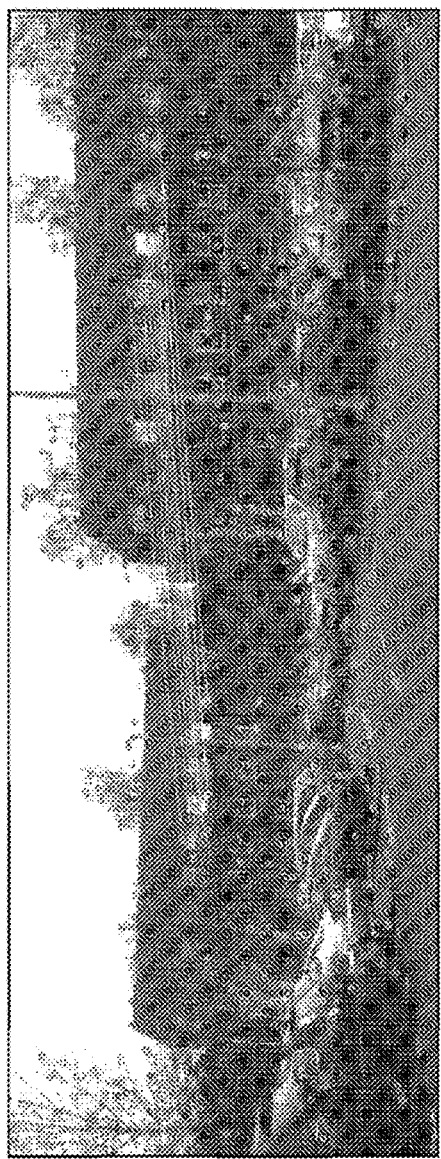
FIG. 13 shows the images of FIG. 8 with corresponding features identified by lines.

Step S41 is performed without reference to the position of the features to which the descriptors correspond, and so may be considered as putative. The aim is to detect pairs of descriptors in separate images which are very similar. This indicates a high probability that the pair of descriptors come from corresponding locations in each image. However, matches are inevitably also found for pairs of patches which look alike but which are not from the same part of the scene. This is illustrated for the example images of FIG. 8 in FIG. 12 where lines are drawn between the matching features in the two images (that are themselves identified in FIG. 9). Herein, the lines connecting features which can be visually determined to have been correctly identified as corresponding are generally parallel (inners') and the lines connecting features which can be visually determined to have been incorrectly identified as corresponding (outliers') are at acute angles thereto.

Accordingly, to remove the outliers, in step S42, from the matching pairs of descriptors there are determined pairs of descriptors that also conform to a common mapping between the positions in the respective images of the features corresponding to those descriptors. That is, the relative locations of the corresponding features are tested for geometrical consistency. For example, a homography (the relative 2-dimensional ordering of features remaining unchanged between the two images) indicates that the matching features lie on a planar surface within the scene.

In step S42, the feature matching is constrained to a subset of physically viable solutions. This can happen a priori by mathematical constraints, or a posteriori by removing solutions that are mathematically correct, but highly unlikely. The latter is obtained by a check for convexity of the transformed image coordinates: the Designator's view is expected to have no twists (no points in the neighborhood of the center in the Designator's view are mapped to infinity).

In a second implementation, this can be obtained mathematically through constrained optimization (quadratic programming).

One approach is to use a variant of a robust estimator, RANdom Sampling And Consensus (RANSAC), in the form proposed in Torr and Zisserman, "MLESAC: A new robust estimator with application to estimating image geometry", Computer Vision and Image Understanding, 78:138-156, 2000 (incorporated herein by reference). The method works by making the assumption that an underlying mapping governs the matches. Here, for a subset of all matches, the image points in one image can be related to the ones from the second image, and vice versa. Random Sampling and Consensus works by selecting the minimum amount of matches required to solve for a mapping. With the solution from this minimal set, the matches are classified as inliers if their error lies below a certain threshold, or as outliers otherwise. In the original version, the mapping is chosen that results in most inliers. Use of a mapping that minimizes the robust errors, i.e. a better overall fit of a smaller number of inliers can be better than a poor fit to many.

The mapping that governs a projective transformation of points on a plane is called a homography, that is when $x_2$ is approximately $Hx_1$ where image points of the positions $x_1$ and $x_2$ in the two images are specified in homogeneous coordinates and the mapping H belongs to $R^{3\times3}$. The elements of H can be solved for explicitly, yielding a 2N×9 equation system $Ah=0_{2N}$:

With the constraint of scale independence of H, this and requires at least N=4 matching points. Further details can be found in Hartley and Zisserman, "Multiple View Geometry in computer vision", Cambridge University Press, Second Edition, 2003 (which is incorporated herein by reference). In one implementation, the putative matches obtained in the previous step are the input to this method, and the outlier threshold is set conservatively to 3 pixels (relative to a 640×480 pixel image).

In case the majority of points come from invalid matches, the RANSAC method can result in the wrong final match. We address this by removing invalid homographies. The homography found in the RANSAC step is applied to a set of points around the center of the first image. If the mapped points result in a non-convex polygon or corners too acute, the match is rejected. This is equivalent to a constraint on positive definiteness or putting linear constraints on the homography's parameters, which can be solved using semi-definite programming techniques, but as we deal with video data, we found the rejection step sufficient.

Step S42 outputs the correspondence data 43 representing the corresponding descriptors in the two images. Where the number of correspondences between the features of the two images is high relative to local feature density, there is a strong likelihood that the images overlap.

In step S5, the geometric calibration of the camera units with respect to the scene from the positions in the respective images of the features corresponding to the detected corresponding descriptors. Accordingly, step S5 uses the correspondence data 43 representing the descriptors that correspond in the two images, and also the position data 41 that represents the positions of the features corresponding to those descriptors. Step S5 outputs calibration data 44 representing the geometric calibration.

The geometric calibration of cameras is a concept which forms the basis of two technical disciplines, photogrammetry and visual geometry. In both cases, the objective is to determine the 3-dimensional positions of points in a scene, relative to two or more cameras, using epipolar geometry, whose principles are well known per se.

In general, the calibration of camera position and attitude ("pose"; extrinsic parameters) and lens properties (intrinsic parameters) for a pair of cameras can be made from fewer than a ten observations of points in the scene. With hundreds of observations, the calibration makes use of non-linear optimization methods (bundle adjustment) to obtain the best solution. Calibrations can be obtained from points on a planar scene (a flat wall, or ground plane) or, with a slightly more complicated algorithm, from a general scene with features at different depths.

If a target is within a scene containing objects at variable depths relative to the designator 2S and/or seeker 2S, it is possible that, due to parallax, the relative locations of matching features differs between the images being compared and may not form a homography. In this case the solution for the relative 3D angular locations and scale of the designator 2D and seeker 2S can, in many cases, still be calculated.

Figure 14:
FIG. 14 shows the images of FIG. 8 overlaid after geometric calibration.

The geometric calibration effectively allows images to be overlaid, so far as they are images of overlapping portions of the same scene. In general, this will require the distortion of one of the images (known as "rectification"). This may only be possible for a small part of the image since other parts show elements of the scene in one camera which are not seen in the other. By way of example, FIG. 14 shows the images of FIG. 8 overlaid on each other after derivation of the geometric calibration therebetween.

Optionally each optical sighting apparatus 2 may additionally include a sensor element 34 for estimating the current attitude and/or geographical position of the camera unit 21. The sensor element 34 may comprise a small, low-cost MEMS AHRS (Attitude and Reference system) that combines measurements from magnetometers, gyroscopes, accelerometers and the like to provide a dynamic estimate of current attitude. Static performance ultimately depends on measurements of the Earth's magnetic field which are susceptible to other magnetic field sources and distortions, and increasing dip angles away from the Equator. The net performance is typically of the order of +3 degrees of azimuth. The sensor element 34 may alternatively or additionally comprise a GPS receiver. A combined GPS/AHRS can provide camera geometry to give approximate direction but, in general, this would not be accurate enough for targeting. However, a GPS/AHRS is ideally suited to provide an approximate bearing.

Accordingly, the accuracy of the estimation in step S5 may be improved by using the output of the sensor element 34, if provided, of the seeker 2S and/or the output of the sensor element 34, if provided, of the designator 2D that is communicated to the seeker 2S over the communications network 4. The seeker 2S may also compare the geoposition and orientation information of the designator 2D to its own geoposition and orientation information to compute an orientation vector, that may be indicated on the display device 26 of the seeker by a graphical overlay. This orientation display indicates to the user of the seeker 2S, the general direction in which the camera unit 21 of the seeker 2S should be pointed in order to allow the collaborative sighting method to be performed.

The accuracy of estimation may also be improved by additionally deriving and using position data 41 and descriptor data 42 in respect of images captured by additional optical sighting apparatuses 2 that form part of the system 1 and may be imaging the same scene.

In step S6, the target location in the image captured by the designator 2D (the designator image) is processed to identify, from the derived geometric calibration represented by the calibration data 44, the corresponding location relative to the image produced by the camera unit 21 of the seeker 2S (the seeker image), that is the location in the seeker image that corresponds to a target location in the scene that itself corresponds to the target location in the designator image.

In general, the target location may be at any position in the designator image, and there may be any number of target locations.

In this embodiment, the target location is at a predetermined position in the designator image, known to the seeker 2S, for example the central location of the designator image, or the boundary of the field of view of the camera unit 21 of the designator 2D (i.e. the boundary of the designator image). As the geometric calibration represents the geometric relationship between the designator image and the seeker image, it is straightforward in step S6 to use this knowledge of the location of the target location in the designator image to identify the corresponding location in the seeker image.

As an alternative, it is possible for designator 2D to allow user to provide user input that designates the position of the target location within the image captured and displayed in the designator 2D, for example using a cursor on the display device 26 of the designator. In that case, the position of the target location in the designator image is not a priori known in the seeker 2S, and so the designator 2D transmits data representing position of the target location to the seeker 2S, for example together with the position data 41 and the descriptor data 42.

In step S7, the seeker 2S indicates on its display device 26 where the corresponding location lies relative to the displayed image, for example by displaying an appropriate overlay thereon.

In the event that the corresponding location is inside the field of view of the seeker 2S, then the corresponding location may be indicated by superimposing a graphical element directly on the image, for example crosshairs if the target location is the central location of the designator image or a quadrilateral shape if the target location is the boundary of the designator image (i.e. the rectangular boundary with appropriate distortion).

Figure 16:
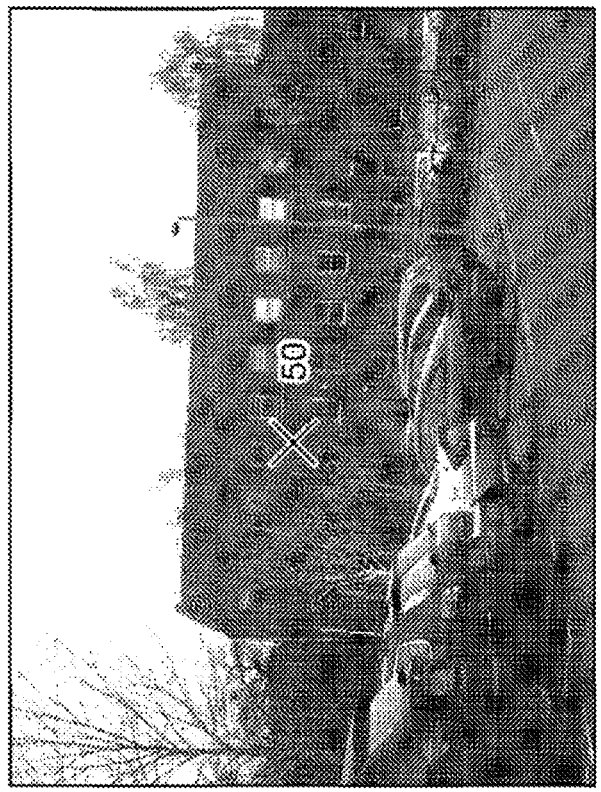

By way of example, FIG. 16 shows a typical image captured by the seeker 2S having superimposed thereon a crosshairs 50 as an example of a graphical element that directly indicates the corresponding location in the case that it is inside the field of view.

However, it is a particular advantage that it is not necessary for the corresponding location to be inside the field of view of the seeker 2S. The collaborative sighting may still be performed in the case that the corresponding location is outside the field of view of the seeker 2S, provided that there is sufficient overlap between the portions of the scene imaged by the optical sighting apparatuses to allow the geometrical calibration to be performed. In this case, the corresponding location may be indicated by displaying a pointer towards the corresponding location, and optionally a distance measure.

Figure 17:
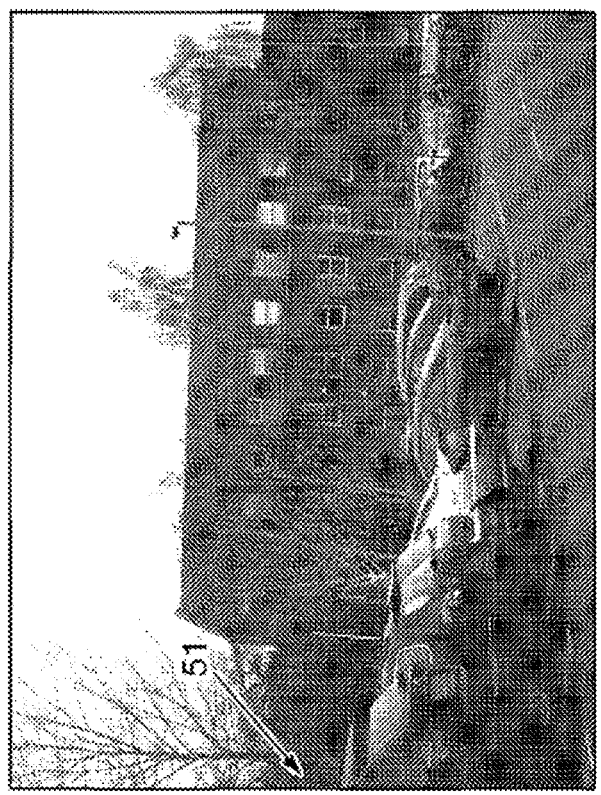
FIGS. 16 and 17 show one of the images of FIG. 8 with an indication of the location corresponding to a target location on the other image.

By way of example, FIG. 17 shows a typical image captured by the seeker 2S having superimposed thereon an arrow 51 as an example of a graphical element that is a pointer indicating the corresponding location in the case that it is outside the field of view.

In either case, user of the seeker 2S is made aware of the target being observed by the Designator. That allows the user seeker 2S to change the field of view of the camera unit 21, for example by changing the pan, tilt or zoom (PZT) of the camera unit, so as to image the corresponding location if outside the field of view or to focus in on the corresponding location. During such adjustment, the method is performed continuously so as to update the position of the corresponding location on the image displayed in the seeker 2S. Because the detection of features and generation of descriptors is scale invariant, the target identification should be sustained. At the end of this process, the seeker 2S is aimed at the same target within the scene that was designated in the designator.

It is possible that a complete geometrical solution cannot be found in step S5 due to insufficient overlap between the portions 24 of the scene 25 being imaged by the designator 2D, seeker 2S, and any other optical sighting apparatuses 2 in the systems 1 (bearing in mind that in general the optical sighting apparatuses could be imaging entirely unrelated scenes if they are in different geographical locations and/or pointing in different directions). In that case, any corresponding features between the designator image and seeker image can nonetheless be displayed to on the display device 26 of the seeker 2S (and optionally also the display device 26 of the designator 2D), allowing the seeker 2S to focus attention on the region of the image containing the correspondences. The user of the seeker 2S may then change the field of view of the camera unit 21 to increase the number of features displayed (e.g. by panning towards them and/or widening the field of view). In that way, the proportion of feature correspondences subject to parallax can be reduced until it is possible to perform the geometric calibration.

Throughout the performance of the method, both the designator 2D and seeker 2S may display graphical overlays on their display devices to indicate the status of the collaborative sighting method, for example the location and identity of matching features, the field of view of contributing optical devices, and the state of operator controls.

The method of collaborative sighting illustrated in FIG. 5 can be modified to distribute the performance of the various steps in other elements of the system 1, that is in other optical sighting apparatuses and/or the central processing apparatus 3, if provided. This can be accommodated by communicating the necessary data for performance of any step over the communications network 4. The method of collaborative sighting illustrated in FIG. 5 minimizes the communication of data over the communications network 4, and so any modification may increase the burden on the communications network 4. On the other hand, such modification may have the benefit of reducing the processing burden on particular optical sighting apparatuses 2, for example the seeker 2S or designator 2D.

In one alternative, the designator 2D could act as an analysis apparatus acts that derives the geometric calibration on the basis of images captured by the designator 2D and seeker 2S, for example by performing steps S4 and S5 in the designator 2D and communicating the calibration data 44 to the seeker 2S.

Figure 15:
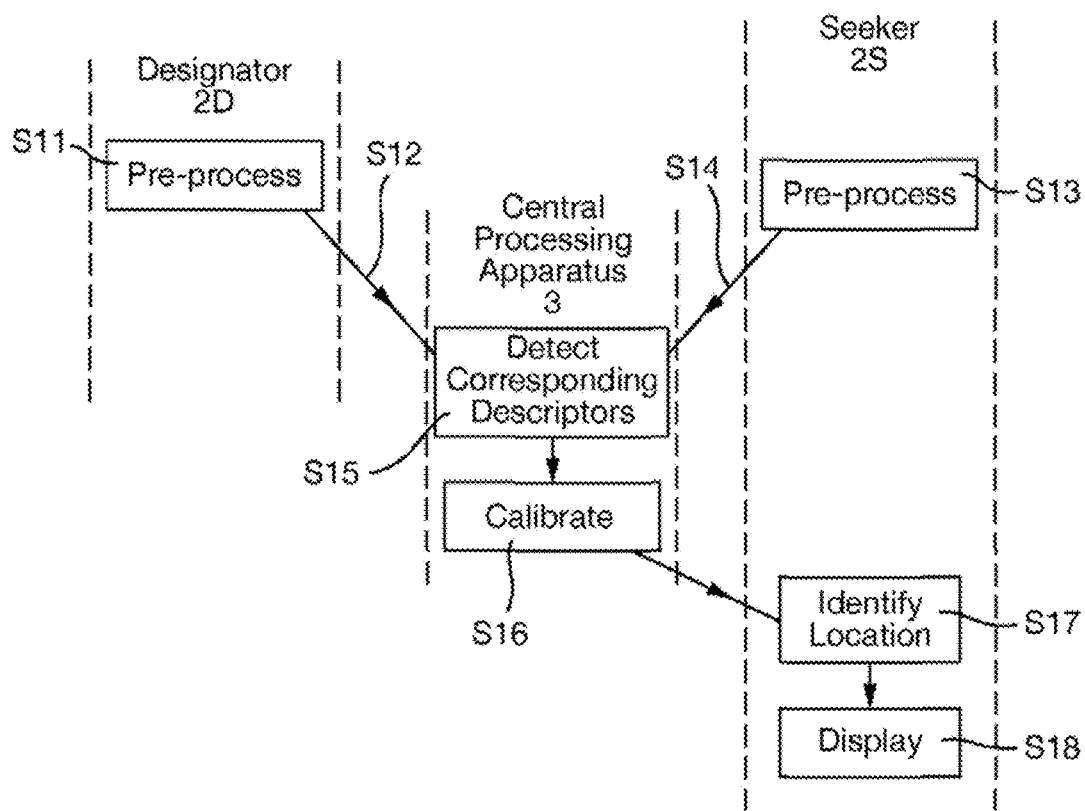
FIG. 15 is a flow chart of an alternative method of collaborative sighting.

In another alternative shown in FIG. 15, the method of collaborative sighting is performed in a system 1 including a central processing apparatus 3 which acts as a an analysis apparatus acts that derives the geometric calibration on the basis of images captured by the designator 2D and seeker 2S. This method will now be described.

In response to an optical sighting apparatus 2 becoming the designator 2D, the designator 2D in step S11 performs a pre-processing method on the image 40 captured by its camera unit 21. This is identical to step S1, i.e. the pre-processing method is that shown in FIG. 6 and described above.

Next in step S12, the designator 2D communicates the position data 41 representing position of each feature within the image 40 and the descriptor data 42 representing the set of descriptors derived in step S11 is communicated to the central processing apparatus 3 over the communications network 4.

Similarly, in step S13, the seeker S2 performs a pre-processing method on the image 40 captured by its camera unit 21. This is identical to step S3, i.e. the pre-processing method is that shown in FIG. 6 and described above.

Next in step S14, the seeker 2S communicates the position data 41 representing position of each feature within the image 40 and the descriptor data 42 representing the set of descriptors derived in step S13 is communicated to the central processing apparatus 3 over the communications network 4.

Steps S13 and S14 may be performed in the seeker 2S either in response to a communication from the designator 2D or the central processing apparatus 3 indicating that a target location has been designated, or continuously.

In an alternative implementation, the designator 2D and seeker 2S may instead communicate the image 40 captured therein to the central processing apparatus 3 over the communications network 4. The communicated image 40 may be compressed, preferably with lossless compression, although lossy compression may alternatively be used and the collaborative sighting can still be performed successfully provided that the degree of compression is not too great. In this case, steps S11 and S13 are performed in the central processing apparatus 3.

The central processing apparatus 3 now acts as an analysis apparatus by performing, in steps S15 and S16, an analysis of the set of descriptors represented by the descriptor data 42 and the position of each feature within the image 40 represented by the position data 41, derived from both the image captured in the designator 2D (i.e. in step S11) and the image captured in the seeker 2S (i.e. in step S13). Steps S15 and S16 are identical to steps S4 and S5, as described above, and output the calibration data 44 representing the geometric calibration of the camera units 21 of the designator 2D and seeker 2S.

In step S17, the calibration data 44 is transmitted to the seeker 2S, which then in step S18 identifies, from the derived geometric calibration represented by the calibration data 44, the corresponding location relative to the seeker image, that that corresponds to a target location in the scene that itself corresponds to the target location in the designator image. In step S19, the seeker 2S indicates on its display device 26 where the corresponding location lies relative to the displayed image, for example by displaying an appropriate overlay thereon. Steps S18 and S19 are identical to steps S6 and S7, as described above.

What is claimed is:

1. A method comprising:
   receiving first position data, wherein the first position data identifies a first position of a first camera unit while first image data was captured;
   receiving second position data, wherein the second position data identifies a second position of a second camera unit while second image data was captured;
   generating, at a processor, calibration data by geometrically calibrating the first image data from the first camera unit relative to the second image data from the second camera unit based on first descriptor data and second descriptor data, wherein the first descriptor data is based on the first image data, wherein the second descriptor data is based on the second image data, and wherein the calibration data is generated based on the first position data and the second position data;
identifying, based on the calibration data, a target location relative to the first image data;
generating an output image, wherein the output image includes the first image data and an indication of where the target location is relative to a scene depicted in the first image data; and
determining that the first camera unit is focused on a second target location based on user input designating the second target location, a plurality of image data captured by the first camera unit, or a combination thereof.

2. The method of claim 1, wherein the calibration data is generated in real time.

3. The method of claim 1, further comprising receiving the second image data from the second camera unit via a communication network.

4. The method of claim 1, wherein the target location corresponds to a center of a second scene depicted in the second image data.

5. The method of claim 1, further comprising generating a second output image, wherein the second output image includes third image data and a second indication of where the second target location is relative to a second scene depicted in the third image data.

6. The method of claim 1, further comprising:
detecting a plurality of features within the first image data;
generating, by the processor, descriptors for each feature of the plurality of features, wherein the first descriptor data includes the descriptors; and
receiving the second descriptor data, wherein the second descriptor data is generated by a second processor coupled to the second camera unit, and wherein the second descriptor data is received from the second processor via a communications network.

7. The method of claim 6, wherein the descriptors include histograms of image gradients in different directions across respective positions of the plurality of features.

8. The method of claim 1, wherein an indicator is overlaid on a picture of the target location in response to the target location being represented in the first image data, and wherein the indicator points in a direction of the target location in response to the target location being located outside of the scene depicted in the first image data.

9. The method of claim 1, wherein the first camera unit is determined to be focused on a second target location in response to receiving the user input designating the second target location, and further comprising, in response to determining that the first camera unit focused on the second target location, transmitting target data indicating the second target location to the second camera unit.

10. The method of claim 1, wherein the first camera unit is determined to be focused on a second target area in response to the plurality of image data indicating that the first camera unit focusing on the second target area for a particular period of time.

11. A apparatus comprising:
a first camera unit configured to generate first image data;
a processor coupled to the first camera unit;
a memory storing instruction that when executed by the processor cause the processor to perform operations including:

generating calibration data by geometrically calibrating first image data from the first camera unit relative to second image data from a second camera unit based on first descriptor data and second descriptor data, wherein the first descriptor data is based on the first image data, and wherein the second descriptor data is based on the second image data;
identifying, based on the calibration data, a target location relative to the first image data;
generating an output image, wherein the output image includes the first image data and an indication of where the target location is relative to a scene depicted in the first image data;
determining that the first camera unit is focused on a second target area; and
in response to determining that the first camera unit is focused on the second target area:
generating, at the processor, third descriptor data based on third image data from the first camera unit; and
transmitting the third descriptor data to a second processor coupled to the second camera unit.

12. The apparatus of claim 11, wherein the first camera unit is coupled to a vehicle.

13. The apparatus of claim 11, further comprising a display unit, wherein the display unit is configured to display the output image.

14. The apparatus of claim 13, further comprising a housing, wherein the first camera unit is coupled to a first side of the housing, and wherein the display unit is coupled to a second side of the housing opposite of the first side.

15. The apparatus of claim 14, wherein the housing is coupled to a weapon, and wherein the first camera unit and display unit are configured to act as a sight for the weapon.

16. The apparatus of claim 11, further comprising an Attitude and Reference System sensor, a Global Positioning System sensor, or a combination thereof.

17. A non-transitory computer-readable medium storing instructions that, when executed by a processor, cause the processor to perform operations comprising:
receiving first position data, wherein the first position data identifies a first position of a first camera unit while first image data was captured;
receiving second position data, wherein the second position data identifies a second position of a second camera unit while second image data was captured;
generating calibration data by geometrically calibrating the first image data from the first camera unit relative to the second image data from the second camera unit based on first descriptor data and second descriptor data, wherein the first descriptor data is based on the first image data, wherein the second descriptor data is based on the second image data, and wherein the calibration data is generated based on the first position data and the second position data;
identifying, based on the calibration data, a target location relative to the first image data based on the calibration data;
generating an output image, wherein the output image includes the first image data and an indication of where the target location is relative to a scene depicted in the first image data; and
determining that the first camera unit is focused on a second target location based on user input designating the second target location, a plurality of image data captured by the first camera unit, or a combination thereof.

18. The non-transitory computer-readable medium of claim 17, wherein the operations further comprise receiving, from a second processor coupled to the second camera unit, target data indicating the target location.

19. A method comprising:
generating calibration data by geometrically calibrating first image data from a first camera unit relative to second image data from a second camera unit based on first descriptor data and second descriptor data, wherein the first descriptor data is based on first image data, and wherein the second descriptor data is based on second image data;
identifying, based on the calibration data, a target location relative to the first image data;
generating an output image, wherein the output image includes the first image data and an indication of where the target location is relative to a scene depicted in the first image data; and
determining that the first camera unit is focused on a second target area; and
in response to determining that the first camera unit is focused on the second target area:
generating third descriptor data based on third image data from the first camera unit; and
transmitting the third descriptor data to a second processor coupled to the second camera unit.

20. An apparatus comprising:
a processor coupled to a first camera unit;
a memory storing instruction that when executed by the processor cause the processor to perform operations including:
receiving first position data, wherein the first position data identifies a first position of a first camera unit while first image data was captured;
receiving second position data, wherein the second position data identifies a second position of a second camera unit while second image data was captured;
generating, at the processor, calibration data by geometrically calibrating the first image data from the first camera unit relative to the second image data from the second camera unit based on first descriptor data and second descriptor data, wherein the first descriptor data is based on the first image data, wherein the second descriptor data is based on the second image data, and wherein the calibration data is generated based on the first position data and the second position data;
identifying, based on the calibration data, a target location relative to the first image data;
generating an output image, wherein the output image includes the first image data and an indication of where the target location is relative to a scene depicted in the first image data; and
determining that the first camera unit is focused on a second target location based on user input designating the second target location, a plurality of image data captured by the first camera unit, or a combination thereof.

* * * * *